Oct. 10, 1961  F. W. REILLY  3,003,759
JIGS FOR FRAME STRUCTURES

Filed March 13, 1957  2 Sheets-Sheet 1

Inventor
Frederick William Reilly
by Sommers + Young
Attorneys

Oct. 10, 1961 F. W. REILLY 3,003,759
JIGS FOR FRAME STRUCTURES
Filed March 13, 1957 2 Sheets-Sheet 2
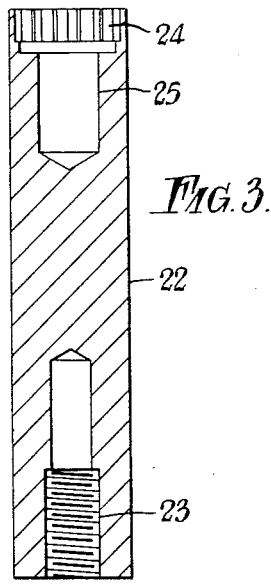
FIG. 3.
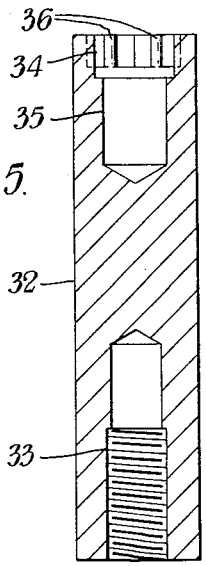
FIG. 5.
FIG. 7.
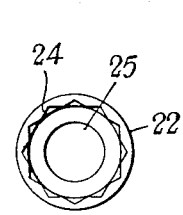
FIG. 4.
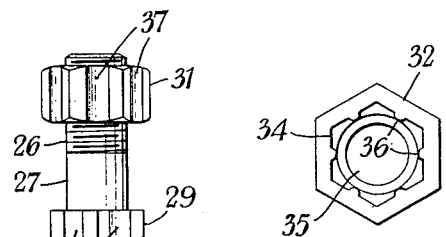
FIG. 6.
FIG. 8.
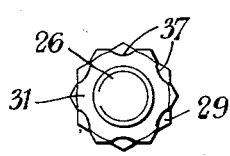
Inventor
Frederick William Reilly
by Sommers & Young
Attorneys United States Patent Office 3,003,759
Patented Oct. 10, 1961

3,003,759
JIGS FOR FRAME STRUCTURES
Frederick William Reilly, Weston, Ontario, Canada, assignor to Dexion Limited, London, England
Filed Mar. 13, 1957, Ser. No. 645,741
Claims priority, application Great Britain Mar. 16, 1956
6 Claims. (Cl. 269—117)

This invention concerns improvements relating to jigs or templates for frame structures composed of bolted structural elements. It is intended especially for frames composed of standard elements in the form of perforated or slotted bars of L-section, such as are described in Patent No. 2,746,780 and application Serial No. 613,278. It can, however, be used with similar elements having other arrangements of holes and other cross sections. It is also applicable, for some purposes, to frames composed of elements of ordinary industrial angle iron and like material.

The invention seeks more particularly to facilitate the work of producing a series of accurately similar frames from such elements, as in practice the production of large or repetition structures such, for example, as ranges of shelving or roof trusses generally involves the production of series of such similar frames. With this object in view, a jig in accordance with the invention comprises a frame and a series of locating members which are applied to or in place of connection means disposed in the jig frame in positions corresponding to the positions of the connection means in the frame to be produced, the said locating members being upstanding from the jig frame and adapted for receiving similarly located connection means to which the elements of the frame to be produced can be applied. Preferably the frame is composed of the same elements and the same connection means as the frame to be produced. Generally, the connection means will comprise bolts, but the invention may be applied with rivets.

A locating member for use in such a jig may comprise a stud-like member tapped at one end to receive the shank of the size of bolt with which it is to be used, or itself provided with a threaded shank, and provided at the other end with a recess of a shape complementary to that of the head of the said bolt, for example of hexagonal shape. Advantageously, the locating member also has, below the recess, a clearance hole for accommodating the shank of a bolt screwed into a nut received in the said recess.

One preferred embodiment of the invention will now be more fully described by way of example and with reference to the accompanying drawings, in which:

FIGURE 3 is an axial section and FIGURE 4 a plan view of a locating member.

FIGURES 5 and 6 are similar views of another form of locating member, and

FIGURES 7 and 8 are a side elevation and plan view of a nut and bolt.

Figure 2:
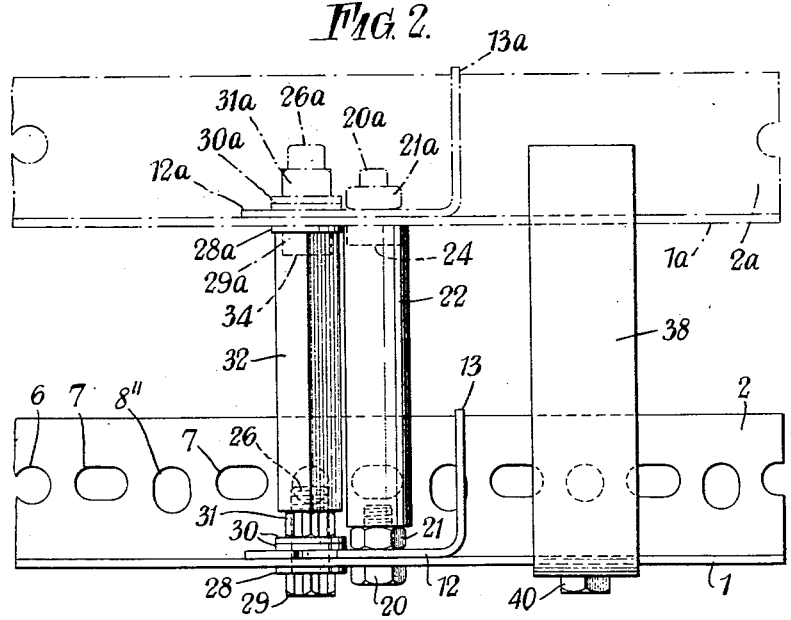
FIGURE 2 is a side elevation of the same connection; the corresponding connection in a frame, being produced with the assistance of the jig, is indicated by chain lines.
Figure 1:
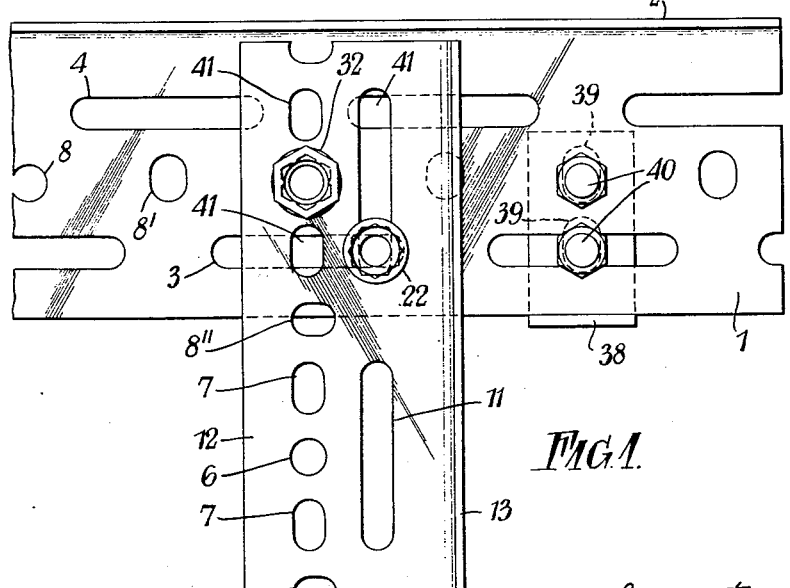
FIGURE 1 is a plan view of one connection in a jig.

The connection illustrated, purely by way of example, in FIGURES 1 and 2 is between the wider flange 1 of a slotted L-section element substantially as shown in FIGURE 1 of application Serial No. 613,278 and the wider flange 12 of an element substantially as is shown in FIGURE 5 of that application. The flange 1 has two lines of long holes 3 and 4 elongated longitudinally of the flange and an intermediate line of alternate round holes 8 and short transversely elongated holes 8'. The other flange 2 (FIGURE 2) of the same element has groups of holes consisting of a round hole 6 between two short longitudinally elongated holes 7, short transversely elongated holes 8" being provided between the said groups. The flange 12 of the second element has an inner line of long holes 11 similar to the holes 3, 4 and an outer line of holes 6, 7, 8" similar to that in the flange 2. The other flange 13 of the second element has a single line of holes 6, 7, 8" (not seen) and is identical with the flange 2. These and other elements, with which the present invention is especially useful, are more fully described, together with various modes of use thereof, in the application referred to. Connections are normally made by means of simple bolts 20 and nuts 21 (FIGURE 2).

For illustration purposes, only one such connection is shown, but it will be appreciated that frames will comprise a plurality of connections between vertical and transverse members and, possibly, bracing members. Such members may consist of single elements, as illustrated, or may be built up from a plurality of elements. Again for illustration purposes, only one bolt 20 and nut 21 are shown, but in practice a connection will generally comprise two, three, four or five bolts depending upon the strength and/or rigidity required for the particular connection.

For the purposes of the invention, a jig is made up comprising a frame which is preferably precisely similar to a series of frames to be produced with respect to the arrangement of the elements and the connections between them. FIGURES 1 and 2 illustrate one connection point between elements of such a jig. The jig also comprises a plurality of locating members 22 applied to each of the bolts 20 of each of the connections.

Each locating member 22 (FIGURES 3 and 4) is a cylindrical stud-like body formed at one end with a tapped hole 23 to be screwed on to the projecting end of a bolt 20 (FIGURE 2) and at the other end with a recess 24 for receiving the head of the bolt to be used at the corresponding point in the frame to be produced. The recess should be so deep that the whole depth of the head is received within it. With hexagonal bolt heads, the recess 24 may also be hexagonal. As illustrated, however, its outline is defined by the crests of two overlapping hexagons (FIGURE 4). This doubles the number of angular positions in which the head will drop into the recess and thus facilitates the operation of placing the bolt in position. In some cases, it may be required to place a nut 21 in the recess 24 and to screw a bolt into the said nut. To permit this, a plain hole 25, capable of accommodating the shank of the bolt freely, is provided below the recess 24. The length of the locating member 22 should be such that when in position on the jig frame, as it is shown in FIGURE 2, its upper end will stand above of any flanges of that frame and that the elements of the frame to be produced will not be obstructed by the jig frame. In the example illustrated, the member 22 is made 3¼" long so that it will stand adequately above a 3" wide flange 1 in a connection in which that flange, instead of the flange 2 in FIGURE 2, is the upwardly projecting flange.

In the case of structures in which bolts of one diameter only are to be used, as is often the case, only the one kind of locating member will be required. In some cases, however, it is the practice to use bolts of different diameters and/or characters: For example, with slotted angle elements such as are illustrated, use is sometimes made, for bolts passing through round holes 6, 8, of special ⅜" bolts fitting those holes and giving positive bearing therein, whereas the other, ordinary, bolts 20 are 5/16" bolts which have some clearance in the holes through which they pass. The fitting bolt 26 (FIGURE 7), unlike the ordinary bolt 20 which is threaded over substantially the whole of its shank, has an unthreaded portion 27 for fitting in the round holes and is generally used with washers either to give additional bearing surface or for packing purposes, for example with a washer 28 under the head 29 and two washers 30 under its nut 31 (FIGURE 2). With such bolts 26, a different form of locating member 32 (FIGURES 5 and 6) is employed. To enable this member 32 to be readily distinguished from the member 22 by sight and feel, it is made hexagonal. It is provided with a tapped hole 33 for screwing on to the bolt 26, a generally hexagonal recess 34 of a shape and depth for receiving a bolt head 29 or nut 31, and a clearance hole 35. To prevent a bolt 20 or a nut 21 from being placed by mistake in the recess 34, which could result in a substantial, unsuspected, reduction in the strength of the frame, the recess 34 is formed with inward projections 36 (FIGURE 6) which will not allow a bolt 20 or nut 21 to be received in the recess. To permit a bolt head 29 or nut 31 to be so received, the flats thereon are formed with flutings 37 complementary to the projections 36. If the bolt head 29 and nut 31 were made larger than the head of the bolt 20 and the nut 21, this would prevent their being placed by mistake in the recess 24. However, in practice it is preferred to use the same size of head and nut for both kinds of bolt, so that one size of ring spanner or wrench socket only is required. The insertion of a ⅜″ bolt 26 in a recess 24 is less serious than the mistake previously referred to, as it will at worst occasion only loss of time, not loss of strength. The formation of the bolts 26 and nuts 31 also assists in readily distinguishing them from bolts 20 and nuts 21. On account of the additional thickness of the nut 31 and washers 28, 30, the locating member 32 must be made correspondingly shorter than the member 22. In the particular example, its length will be 2⁶¹⁄₆₄″.

To avoid confusing the drawing, FIGURES 1 and 2 show a connection made by one bolt 20 and one bolt 26. Obviously bolts could also be used at any or all of the points 41 (FIGURE 1). The external dimensions of the locating members 22 and 32 are made such that a plurality of such members can be placed as close together as may be necessary for the closest grouping of bolts required.

The preferred modus operandi is as follows:

First of all a jig frame is made up which is preferably identical with the frames to be produced, but having the locating members 22 and/or 32 screwed on to the projecting shanks of the bolts 20 and/or 26 above the nuts 21 and/or 31 respectively. The jig frame is then mounted or laid on a support at a convenient level with the locating members projecting upwardly and a bolt 20 or 26 is placed in the upper end of each such member with its head in the recess 24 or 34 and its shank projecting freely upwards, washers being placed over the bolts where required. Frame elements identical with those of the jig frame are assembled on the shanks of the bolts in the same positions as the jig elements and it then only remains to place nuts 21 and/or 31 on each of the said bolts and to tighten them up. This last operation obviously lends itself well to the use of power wrenches. In FIGURE 2, the parts associated with the connection in the frame produced with the assistance of the jig frame are indicated by the same reference numerals but with a suffix a.

Such a jig has many advantages for the production of a series of frames, even if the number of frames of any one kind may not be very large: Apart from the considerable saving in time and labour which can be achieved in actual production by using a jig, the preparation of the present form of jig involves practically no additional time, labour or material, as the jig frame itself may remain as, or be completed as, the last frame of a series to be produced, after removal of the locating members 22 and/or 32. The only additional material or apparatus required is a set of locating membrs which can be used over and over again for whatever different frames are required. The locating members themselves can be produced inexpensively and, due to their size and shape, involve no difficulty in storage or transport. The expense is thus negligible.

Further, the jig enables inexpert labour to be employed. Indeed once the jig has been prepared, native or other very unskilled labour can easily complete the series of frames to be produced, as the jig may present the precise frame pattern, always there to be followed in the exact physical form to be produced and directly under the frame being assembled. There is no need for reference to written instructions or even to drawings.

Finally, the use of the jig enables the time required to produce a given series of frames not only to be reduced very greatly, but also to be estimated in advance far more accurately.

In comparison with a jig in accordance with the invention, an ordinary permanent jig would have to be prepared by skilled craftsmen and its transport and storage may cause difficulties. When no longer required, the permanent jig would have little or no value.

In some cases, it may be advantageous to apply the jig to a supporting structure, which may be mobile, designed to facilitate the work and make it as accessible as possible, for example a frame structure carrying supplies of cut lengths of slotted angle, nuts, bolts and other components.

For some purposes, further, the jig may be provided with lay gauges for assisting in the positioning of the elements. As illustrated, such a gauge may consist of a simple L-shaped bracket 38 (FIGURES 1 and 2) with one or more slightly elongated holes 39 in at least one limb by which it can be secured to the jig frame by bolts 40. Right-angle gauges may also be provided for ensuring accurate right angles in the jig.

Various modifications can be made in the locating members 22 and 32: The recesses 24, 34 need not be basically hexagonal. A recess may be complementary to a bolt head of other than hexagonal form, for example a square head, or may be shaped to engage a flat on an otherwise round head, so as to prevent turning of the bolt in relation to the recess. The recess may be formed in a slightly enlarged head on the locating member. In addition to their use with ⅜″ bolts, washers may be used with a locating member in any position in which it is necessary to pack up the member to a slightly greater height. For some purposes, it may be convenient to provide locating members longer than those illustrated. In certain cases, it may be preferred to employ locating members screwed upon bolts placed in the jig frame without nuts.

Instead of being provided with tapped holes 23, 33, the lower ends of the locating members may be formed with threaded shanks by which they can be screwed into nuts held below the jig frame.

In the case of a jig for a frame in which the connection means comprise rivets, the ends of the locating members may be formed with recesses complementary to the shapes of the rivet heads.

I claim:

1. For use in producing a frame from a plurality of perforated elements to be connected together by bolts, a jig comprising perforated elements, arranged in the form of the frame to be produced, bolts connecting said elements of said jig, and a plurality of upstanding locating members applied to the bolts of the jig, each locating member being a stud-like member provided, at one end, with a screw-threaded hole by which it is engaged with the shank of the bolt to which it is applied and, at the other end, with a recess of a shape and size complementary to the shape and size of the head of the bolt.

2. A locating member as claimed in claim 1, wherein the recess is provided with projecting formations for preventing the insertion in it of a bolt head or nut not provided with complementary formations.

3. A locating member as claimed in claim 1 and having below the recess a clearance hole for accommodating the shank of a bolt screwed into a nut received in the said recess.

4. For use in producing a frame from a plurality of perforated elements to be connected together by bolts, a jig comprising perforated elements, arranged in the form of the frame to be produced, bolts connecting said elements of said jig and a plurality of upstanding locating members applied to the bolts of the jig, each locating member being a stud-like member provided, at one end, with a screw-threaded hole by which it is engaged with the shank of the bolt to which it is applied and, at the other end, with a recess of a shape and size complementary to the shape and size of the head of the bolt, and the depth of said recess being substantially equal to the depth of the said head so as to hold the said head at the said other end of the same member.

5. A jig for producing a frame from a plurality of perforated elements connected by connection means extending through the perforations of said elements, comprising a jig frame composed of similar elements and similar connection means as the said frame to be produced and a series of locating members applied to the connection means of the jig frame in the same positions as the connection means of the frame to be produced, the said locating members being upstanding from the jig frame and receiving the last-named connection means, to which the elements of the frame to be produced can be applied, directly over the respectively corresponding connection means in the jig frame.

6. A jig as claimed in claim 5 and comprising two different kinds of bolts and two different kinds of locating members for use with the respective kinds of bolts, each locating member consisting of a stud-like member tapped at one end to have screw-thread engagement with the shank of the size of bolt with which it is to be used, and provided at the other end with a recess of a shape and size complementary to that of the head of the said size of bolt, and the said two kinds of locating members differeing in their external shape, for example, one being cylindrical and the other prismatic, so that they can be readily distinguished.

References Cited in the file of this patent
UNITED STATES PATENTS

| | | |
|---|---|---|
| 1,643,901 | Peterson | Sept. 27, 1927 |
| 1,870,612 | De Schebeko | Aug. 9, 1932 |
| 2,212,421 | Henderson | Aug. 20, 1940 |